United States Patent [19]

Sicklesteel et al.

[11] 4,229,336
[45] Oct. 21, 1980

[54] SELF CROSS-LINKING N-METHYLOL FUNCTIONAL EMULSION POLYMERS USING POLYCARBOXYLIC ACID SURFACTANT

[75] Inventors: Bruce G. Sicklesteel, Hoffman Estates; Dale F. Anders, Fox River Grove, both of Ill.

[73] Assignee: DeSoto, Inc., Des Plaines, Ill.

[21] Appl. No.: 9,397

[22] Filed: Feb. 1, 1979

[51] Int. Cl.$^2$ .............................................. C08L 33/24
[52] U.S. Cl. ............................ 260/29.6 NR; 252/356; 260/29.4 UA; 260/29.6 WB; 260/29.6 TA; 260/29.6 H; 427/388.2; 526/20 L; 526/304
[58] Field of Search .............. 260/29.4 UA, 29.6 WB, 260/29.6 NR, 29.6 HN, 29.6 TA, 29.6 H, 835, 836, 837 R, 851; 526/203, 304, 20 L; 252/356; 427/388 A

[56]     References Cited
U.S. PATENT DOCUMENTS

| | | |
|---|---|---|
| 3,444,151 | 5/1969 | Verdol et al. .......................... 526/203 |
| 3,860,549 | 1/1975 | Sekmakas ....................... 260/29.6 TA |
| 4,090,991 | 5/1978 | Fukusaki et al. ......... 260/29.6 NR X |
| 4,116,903 | 9/1978 | Lietz et al. .............. 260/29.6 NR X |
| 4,129,544 | 12/1978 | Craig ........................... 260/29.6 NR |
| 4,132,686 | 1/1979 | Toyoshima et al. .... 260/29.6 NR X |

Primary Examiner—John D. Smith
Assistant Examiner—Thurman K. Page
Attorney, Agent, or Firm—Dressler, Goldsmith, Shore, Sutker & Milnamow, Ltd.

[57]     ABSTRACT

This invention relates to self cross-linking aqueous emulsion coating compositions comprising water and an emulsion polymer emulsified therein, and methods for their production. The emulsion polymer is comprised of copolymerized monomers including at least about 3 percent by weight of a $C_2$–$C_8$ saturated alcohol ether of a monoethylenically unsaturated N-methylol functional monomer. The monomers making up the emulsion copolymer are emulsified during copolymerization by a polycarboxylic acid emulsifying agent which is partially neutralized with a volatile base to provide a pH of at least about 4.

14 Claims, No Drawings

SELF CROSS-LINKING N-METHYLOL FUNCTIONAL EMULSION POLYMERS USING POLYCARBOXYLIC ACID SURFACTANT

TECHNICAL FIELD

This invention relates to aqueous emulsion coating compositions which cure on baking.

BACKGROUND ART

Aqueous emulsion coating compositions adapted to cure when baked normally employ an emulsion copolymer in combination with an aminoplast resin, such as a melamineformaldehyde condensate, as a curing reactant. This cure is usually catalyzed by the presence of an acid catalyst. These known aqueous emulsion systems tend to lose gloss on exposure and are otherwise inadequately durable. Efforts to overcome these drawbacks by incorporating the N-methylol curing functionality supplied by the aminoplast resin into the aqueous emulsion copolymer encounters difficulty because the N-methylol functionality tends to prereact during the copolymerization. Also, the surfactant which stabilizes the emulsion system tends to impair the desired properties.

DISCLOSURE OF INVENTION

In accordance with this invention, self crosslinking aqueous emulsion coating compositions are prepared comprising water and an emulsion polymer emulsified therein. The emulsion polymer is comprised of copolymerized monomers including at least about 3 percent by weight of a $C_2-C_8$ saturated alcohol ether of a monoethylenically unsaturated N-methylol functional monomer. The monomers making up the emulsion copolymer are emulsified during copolymerization by a polycarboxylic acid emulsifying agent which is partially neutralized with a volatile base to provide a pH of at least about 4. The above described aqueous monomer emulsions are heated to a temperature of about 40° C. to about 70° C. in the presence of a redox couple catalyst system to prepare the aqueous emulsion coating compositions of this invention.

The coating compositions of this invention possess improved durability, and the improvement is conveniently measured by observing gloss retention and blushing (whitening) on soaking in water, as well as the coating's resistance to ketones.

Referring more particularly to the self cross-linking coating compositions, the term "self cross-linking" as used herein denotes the fact that the emulsion copolymer well cure on baking in the absence of any extraneous curing agent.

Referring to the emulsion copolymers which are used in the invention, they are comprised of copolymerized monoethylenically unsaturated monomers. The selection of the unsaturated monomers other than the monomer providing N-methylol functionality is of secondary significance for the monomers are not selected differently herein than is common in the art. In preferred practice, at least 50 percent of the copolymer is constituted by nonreactive monomers by which is meant monoethylenic monomers which do not react, except through their single ethylenic group, under the conditions of copolymerization and use. This normally means that the single ethylenic group is the sole functional group. Suitable monomers are illustrated by $C_1-C_8$ saturated alcohol esters of acrylic and methacrylic acids, such as methyl methacrylate and butyl acrylate, styrene and its alkyl derivatives such as vinyl toluene, $C_2-C_{18}$ saturated acid esters of vinyl alcohol such as vinyl acetate and vinyl propionate, acrylonitrile, N,N-disubstituted amides such as N,N-dimethyl acrylamide and N-vinylpyrrolidone, and the like.

Up to about 30 weight percent of the copolymers may be constituted by polyethylenically unsaturated polymers. These additional polymerizable species are illustrated by polyesters, and polyepoxy esters and polyepoxy ethers. Suitable polyesters are described in U.S. Pat. No. 4,132,668 to D. J. Berenschot, D. F. Anders and F. D. Hawker (see Hydroxy-Functional Polyester A). Copolymerizable epoxy ethers are shown in U.S. Pat. No. 4,085,161 to K. Sekmakas and R. Shah, such as the oleyl ethers illustrated in Example 2. Copolymerizable epoxy ethers are illustrated in Application Ser. No. 844,021 of K. Sekmakas and R. Shah filed Oct. 21, 1977 and now U.S. Pat. No. 4,151,131, see the esters produced in Example 1.

At least about 3 percent by weight of the copolymer is constituted by a $C_2-C_8$ saturated alcohol ether of a monoethylenically unsaturated N-methylol functional monomer. The preferred N-methylol functional monomer, which is used in the form of its ether, is N-methylol acrylamide, but other similar amides such as N-methylol methacrylamide and the like are also useful. Amides are not essential, since N-methylol allyl carbamate can be used. However, the preferred materials contain the group

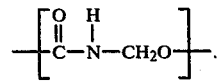

In addition, N-methylol derivatives of imides such as N-methylol maleimide may also be used.

The lower limit of about 3 percent has significance. This is because at least about 3 percent is needed to provide a reasonable cure. However, when about 3 percent or more of the N-methylol functional monomer is present, premature cross-linking becomes a problem. This can lead to gellation or to application difficulties, or it can simply consume expensive monomer without providing any advantage in the cured product. As a practical matter, more than about 30% of N-methylol functional monomer tends to produce an excessive cross-link density which should be avoided since unduly brittle films are provided, but this is of secondary significance. Preferred preparations contain from about 6 percent to about 15 percent, based on the total monomer weight.

The N-methylol functional group must be etherified with a saturated alcohol having from 2–8 carbon atoms. In the absence of etherification, the N-methylol functionality will cross-link prematurely during the aqueous emulsion copolymerization. The ether group must contain at least 2 carbon atoms to provide reasonable hydrolytic stability. More than about 8 carbon atoms produces a sluggish cure on baking because the alcohol is inadequately volatile. Unsaturated alcohols can cause undesired cross-linking during copolymerization and should be avoided. Suitable alcohols, including ether alcohols are ethanol, propanol, isopropanol, butanol, isobutyl alcohol, hexyl alcohol, 2-methoxyethanol, 2-butoxyethanol, and the like. Isobutyl alcohol is particularly preferred since it has excellent hydrolytic stability and is easily removed on baking.

Reactive monoethylenic monomers may also be present. Up to about 10% by weight, preferably 0.5 to 3%, of monoethylenically unsaturated carboxylic acid, such as acrylic acid or methacrylic is helpful for improved coating adhesion and an acidic environment which assists the N-methylol cure, but acid is not essential. Hydroxy functionality may also be included as by the use of up to about 25 percent by weight of monoethylenically unsaturated hydroxy functional compound, such as hydroxyethyl acrylate. However, the hydroxy monomers have been tried and provided little benefit so their inclusion as major components is hard to justify. Similarly, amides, such as acrylamide may be used.

The selection of the surfactant which stably emulsifies the monomers during the copolymerization is important to the invention. The usual surfactants employed in emulsion copolymerization are either anionic or nonionic. The usual anionic surfactants are sulfonates, phosphates and the like. Several of these were tried, namely, Triton X-200, a trademark name for a sulfonate containing emulsifier available from Rohm & Haas Company, Aerosol 501, a trademark name for a sulfonated surfactant available from Armerican Cyanamide Co., and Triton QS-9, a trademark name for a phosphate emulsifier available from Rohm & Haas Company, but the films from copolymers made with these surfactants cure poorly (removed by 3 double rubs with a methyl ethyl ketone saturated cloth). Also, the films whitened (blushed) in a few minutes of water soaking. GAF product EP-120 (ammonium salt of nonyl phenoxy plyethyleneoxy ethanol sulfate (30 moles of ethylene oxide per mol of phenol) was used, but the films were removed by from 1-3 ketone double rubs. Siponic F-707, a trademark name for a nonionic emulsifier from Alcolac, Inc., was better than the anionic sufactants noted, but the films were still easily removed with ketone (13-20 double rubs). Using a partially neutralized polycarboxylic acid emulsifying agent, the films survived 50 double rubs with ketone, and no whitening took place after 24 hours of water soaking.

The above tests were carried out by drawing down the latex on aluminum panels with a #26 wire wound rod and baking in a 500° F. oven for 30 seconds (peak metal temperature 450° F.). The cured panels are immediately quenched with water.

The polycarboxylic acid emulsifying agents preferred for use herein are addition polymers having an average molecular weight in the range of about 600 to about 3000 and contain at least about 25 mole percent of copolymerized monoethylenically unsaturated carboxylic acid. The balance of these polymers is comprised of monoethylenically unsaturated monomers of hydrophilic character and the copolymer is chain terminated with a mercaptan containing at least about 8 carbon atoms. Particularly preferred is a copolymer whose monomers are comprised of about 50 mole percent acrylic acid and about 50 mole percent acrylonitrile and whose polymer chain is terminated by dodecyl mercaptan. The average molecular weight of this polymer is about 1200 and it is commercially available from Uniroyal, Inc. under the trademark name of Polywet NHX-4.

About 0.5 to about 10 weight percent, based on the monomer weight, of the polycarboxylic acid emulsifying agent is typically used for the polymerizations of this invention. Preferably, the polycarboxylic emulsifying agent is used at about 2 to about 6 weight percent of the monomer weight.

Additionally, it has also been found tolerable to use the polycarboxylic acid emulsifying agent in admixture with a nonionic emulsifier which may be present up to about 6 percent by weight of the monomers. Thus, about 6 weight percent of the particularly preferred polycarboxylic acid emulsifying agent may be used with about 2 weight percent of a nonionic emulsifier, such as Triton X-405 (a trademark name for a nonionic emulsifier available from Rohm & Haas Company). Using this system, the advantage of employing the polycarboxylic acid emulsifying agent is retained to a considerable extent.

It is desired to stress that the polycarboxylic acid emulsifying agents (when appropriately neutralized) are unique in providing an emulsion copolymer which cures well on baking. The other anionic surfactants did not provide this result. Also, the carboxyl groups in the surfactants are reactive with the N-methylol functionality in the copolymer, so the usual degradation of the cured film by the surfactant is avoided or minimized. The cross-link density supplied by the polycarboxylic acid emulsifying agents also help to minimize the amount of N-methylol-functional monomer needed for an acceptable cure. This conclusion is based on the small proportion of N-methylol monomer needed, although the high molecular weight of the emulsion copolymer also contributes to the desirable result.

It will be observed that these emulsifying agents are acidic and the copolymerization reaction requires moderate heat and these conditions can cause prereaction of the etherified N-methylol groups. The longer the alcohol is used for etherification, and the lower the temperature, the less the danger of premature reaction, but in this invention the tendency toward undesirable prereaction is limited by adjusting the pH of the polymerization medium. This is done by partially neutralizing the available carboxyl functionality, and it will be understood that some of the acid groups are in the emulsifying agent and some may also be present in the copolymer. Sufficient base, preferably a volatile base such as ammonia or other amine, is added to maintain the pH during polymerization in the range of at least about pH 4, preferably at about pH 5–7. The final coating aomposition may have a pH of from about 2 to about 9, but it is preferably in the range of pH 4–8, most desirably in the range of pH 4–7.

Amines, such as dimethylethanolamine, are well known to be useful when a volatile amine is required, but present experience indicates that ammonia is preferred as the volatile base.

The emulsion copolymerization is itself conventional except for the use of moderate temperature (40° C.–70° C.) and pH regulation as previously noted. Thus, water is preheated in a reactor and an emulsion of the monomers in additional water is slowly added. This monomer emulsion contains the desired monomers, the surfactant and an oxidizing component of a redox couple catalyst system. It also contains sufficient ammonia or other amine to provide the desired pH. A reducing agent is added periodically to the reactor as the monomer emulsion is supplied to maintain the copolymerization. While many suitable redox couple combinations are known to the art, the presently preferred oxidizing agent is t-butylhydroperoxide (0.2 percent by the weight of monomers), and the presently preferred reducing agent is sodium formaldehyde sulfoxylate which is used in water solution.

BEST MODES FOR CARRYING OUT THE INVENTION

EXAMPLE I

A mixture of monomers is emulsified into 550 g. of water in a container. The monomer mixture contains 8 weight percent N-iso-butoxymethyl acrylamide, 2 weight percent glacial methacrylic acid, and 90 weight percent of a 1:1 by weight mixture of methyl methacrylate and butyl acrylate. Sufficient monomer mixture is added to provide 70 weight percent of monomer in the emulsion. The water also has added thereto 4 percent by weight of the monomer mixture of a polycarboxylic acid copolymer emulsifying agent having an average molecular weight of about 1200 and which is constituted by equimolar proportions of acrylic acid and acrylonitrile, the copolymer being chain terminated with dodecyl mercaptan (See Note 1). The water, monomer and emulsifier are then agitated to create an emulsion. The emulsion has added thereto 0.2 percent, based on the weight of monomers of t-butylhydroperoxide as an oxidizing agent and 10 g. of ammonium hydroxide are added to provide a pH of about 5-6.

The above premixed emulsion is slowly added over a period of 3 hours to a reactor containing 800 g. of water preheated to 60° C. During the addition period, 2.4 g. of sodium formaldehyde sulfoxylate in 190 cc of water (reducing agent) are added to maintain the reaction; the reaction temperature being maintained at 60° C. When the emulsion addition is completed, the reaction emulsion is maintained at 60° C. for ½ hour and then cooled to room temperature.

An aliquot was taken from the cooled emulsion and drawn down over an aluminum panel with a #26 wire wound rod, placed in an oven at 500° F. for 30 seconds (peak metal temperature reaching 450° F.), taken out and immediately quenched in water. The resulting film coating resisted 50 double rubs with a methyl ethyl ketone soaked cloth and did not whiten after soaking in water for 24 hours.

Note 1. Polywet NHX-4, a trademark named Polycarboxylic acid emulsifier, available from Uniroyal, Inc., may be used.

EXAMPLE II

Example I was repeated with the addition of 5 percent by weight, of the monomer mixture, of hydroxyethyl acrylate replacing an equal amount by weight of the 1:1 methyl methacrylate-butyl acrylate mixture. The results obtained on testing were substantially the same as those obtained in Example I.

EXAMPLE III

Example I was repeated using 6 percent of the polycarboxylic acid emulsifying agent and 2 percent of a nonionic emulsifying agent (See Note 2), both weight percentages being based on the monomer mixture's weight. The emulsion had a pH of 6.0 and contained about 51 percent solids. The test results obtained using the emulsion produced were substantially similar to those obtained in Example 1, but the emulsion lifetime was lengthened somewhat.

Note 2. Triton X-405, a trademark name for a nonionic emulsifying agent, available from Rhom & Hass Company, may be used.

EXAMPLE IV

Example III was repeated using 6 weight percent based on the monomer mixture, of various other types of emulsifiers, instead of the polycarboxylic acid emulsifier, along with the nonionic surfactant at a 2 weight percent level. In each instance, the emulsion pH was between 6.0 and 7.1 and the solids levels were between 49.5 and 51 percent. Properties of the product emulsions are listed in the table below.

TABLE

| Properties of Emulsions Made Using Other Than a Polycarboxylic Acid Emulsifier | | | |
|---|---|---|---|
| Emulsifier Type | Ketone Resistance[3] | Water Soak Rating[4] | Emulsion Stability (Mechanical) |
| Example III | 50 | 10 | 4 min. |
| Sulfonate[5] | 2–3 | 0 | 15 min. |
| Sulfonate[6] | 2–3 | — | ⅜ min. |
| Phosphate[7] | 0–1 | 0 | 8 min. |
| Sulfate[8] | 1–3 | 0 | 4 min. |
| Nonionic[9] | 13–20 | — | 4 min. |

Note [3]Double rubs with a methyl ethyl ketone soaked cloth.
Note [4]Scale of 0–10 in which 10 is perfect.
Note [5]Triton X-200
Note [6]Aerosol 501
Note [7]Triton QS-9
Note [8]EP-120
Note [9]Siponic F-707.

This nonionic emulsifier was used at a total of 8 weight percent based on the monomer mixture rather than mixing two different nonionic emulsifiers.

In the above notes it will be appreciated that the commercial products referred to have been described earlier.

EXAMPLE V

Example III was repeated and after the copolymerization reaction was completed, and the reaction mixture cooled to ambient temperature, sufficient additional ammonia was added to raise the pH to 8.3. The product emulsion lasted for 13 minutes before breaking with only slight decreases in ketone resistance and water soak ratings.

What is claimed is:

1. A self cross-linking aqueous emulsion coating composition comprising water having emulsified therein an emulsion polymer comprised of copolymerized monoethylenically unsaturated monomers including at least about 3 percent by weight of a $C_2$–$C_8$ saturated alcohol ether of a monoethylenically unsaturated N-methylol functional monomer, said monomers being emulsified during copolymerization by a polycarboxylic acid emulsifying agent partially neutralized with a base to provide a pH of at least about 4, said polycarboxylic acid emulsifying agent being present at about 0.5 to about 10 percent by weight of said monomers and being an addition copolymer having an average molecular weight in the range of about 600 to about 3000 and containing at least about 25 mole percent of copolymerized monoethylenically unsaturated carboxylic acid, the balance of the monomer in said addition copolymer being monoethylenically unsaturated monomer of hydrophilic character, said addition copolymer chain being terminated with a mercaptan containing at least 8 carbon atoms.

2. An emulsion coating composition as recited in claim 1 in which said saturated alcohol ether of a monoethylenically unsaturated N-methylol functional monomer is N-iso-butoxymethyl acrylamide.

3. An emulsion coating composition as recited in claim 1 in which the pH is in the range of pH 4–8.

4. An emulsion coating composition as recited in any of claim 1, 3 or 4 in which said saturated alcohol ether of a monoethylenically unsaturated N-methylol functional monomer is present at about 6 to about 15 percent by weight of said monethylenically unsaturated monomers.

5. An emulsion coating composition as recited in claim 1 in which up to about 30 percent by weight of said emulsion polymer is comprised of polyethylenically unsaturated polymers selected from the group consisting of polyesters, polyepoxy esters, polyepoxy ethers, and mixtures thereof.

6. An emulsion coating composition as recited in claim 1 in which at least about 50 percent by weight of said monoethylenically unsaturated monomers are non-reactive.

7. An emulsion coating composition as recited in claim 1 in which said monoethylenically unsaturated monomers include up to about 3 percent by weight of monoethylenically unsaturated carboxylic acids and up to 25 percent by weight of monoethylenically unsaturated hydroxy functional monomers.

8. A self cross-linking aqueous emulsion coating composition comprising water having emulsified therein an emulsion polymer comprised of copolymerized monoethylenically unsaturated monomers including, about 6 to about 15 percent by weight of a $C_2$-$C_8$ saturated alcohol ether of a monoehylenically unsaturated N-methylol functional monomer, at least about 50 percent by weight of monoethylenically unsaturated nonreactive monomers, up to about 3 percent by weight of monoethylenically unsaturated carboxylic acids, up to about 25 percent by weight of monoethylenically unsaturated hydroxy functional monomers, and up to about 30 weight percent by weight of polyethylenically unsaturated polymers selected from the group consisting of polyesters, polyepoxy esters, polyepoxy ethers, and mixtures thereof, said monomers and polymer being emulsified by a polymeric carboxylic acid emulsifying agent, said polymeric emulsifying agent being present at about 0.5 to about 10 percent of said monomers and having an average molecular weight in the range of about 600 to about 3000 and containing at least about 25 mole percent of copolymerized monoethylenically unsaturated carboxylic acid, the balance of the monomer in said emulsifying agent being monoethylenically unsaturated monomer of hydrophilic character, said emulsifying agent's polymeric chain being terminated with a mercaptan containing at least 8 carbon atoms, and said polymeric emulsifying agent being partially neutralized with ammonia to a pH of about 5–7.

9. An aqueous emulsion coating composition as recited in claim 8 in which said polymeric carboxylic acid emulsifying agent is a copolymer of approximately equimolar amounts of acrylic acid and acrylonitrile chain terminated with dodecyl mercaptan and having an average molecular weight of about 1200, said emulsifying agent being present at about 2 to about 6 percent by weight of said monomers.

10. An emulsion coating composition as recited in claim 8 in which said N-methylol function monomer is a derivative of acrylamide.

11. An emulsion coating composition as recited in claim 10 in which said saturated alcohol ether of a monoethylenically unsaturated N-methylol functional monomer is N-iso-butoxymethyl acrylamide.

12. A method of producing a self cross-linking aqueous emulsion copolymer comprising heating an aqueous emulsion of monoethylenically unsaturated monomers including at least about 3 percent by weight of a $C_2$-$C_8$ saturated alcohol ether of a monoethylenically unsaturated N-methylol functional monomer to a temperature in the range of about 40° C. to about 70° C. in the presence of a redox couple catalyst system, said monomers being emulsified by means of a polycarboxylic acid emulsifying agent which is partially neutralized in said emulsion by means of a volatile base to provide a pH during copolymerization of at least about 4, said polycarboxylic acid emulsifying agent being present at about 0.5 to about 10 percent by weight of said monomers and being an addition copolymer having an average molecular weight in the range of about 600 to about 3000 and containing at least about 25 mole percent of copolymerized monoethylenically unsaturated carboxylic acid, the balance of the monomer in said addition copolymer being monoethylenically unsaturated monomer of hydrophilic character, said addition copolymer chain being terminated with a mercaptan containing at least 8 carbon atoms.

13. A method as recited in claim 12 in which said saturated alcohol ether of a monoethylenically unsaturated N-methylol functional monomer is present at about 6 to about 15 percent by weight of said monoethylenically unsaturated monomers and the balance of said copolymer is provided by monoethylenically unsaturated monomers.

14. A method as recited in claim 13 in which said polycarboxylic acid emulsifying agent is present at about 2 to about 6 percent by weight of said monomers and is a copolymer having an average molecular weight of about 1200 and is comprised of approximately equimolar amounts of acrylic acid and acrylonitrile, said copolymer being chain terminated by dodecyl mercaptan, and said copolymer being partially neutralized with ammonia to achieve an emulsion of about pH 5–7.

* * * * *